(12) United States Patent
Persson (10) Patent No.: US 9,552,094 B2
(45) Date of Patent: Jan. 24, 2017

(54) USER INTERFACE RESPONSIVENESS IN AN ELECTRONIC DEVICE HAVING A TOUCH SCREEN DISPLAY

(75) Inventor: Lars Persson, Sodra Sandby (SE)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 0 days.

(21) Appl. No.: 13/334,595

(22) Filed: Dec. 22, 2011

(65) Prior Publication Data

US 2013/0162584 A1 Jun. 27, 2013

(51) Int. Cl.
| | | |
|---|---|---|
| G06F 3/044 | (2006.01) | |
| G06F 3/041 | (2006.01) | |
| G06F 1/32 | (2006.01) | |
| B60K 35/00 | (2006.01) | |
| B60K 37/06 | (2006.01) | |
| G09G 5/36 | (2006.01) | |

(52) U.S. Cl.
CPC .......... G06F 3/0416 (2013.01); B60K 35/00 (2013.01); B60K 37/06 (2013.01); G06F 1/3203 (2013.01); G06F 1/3231 (2013.01); G06F 1/3265 (2013.01); G06F 3/044 (2013.01); B60K 2350/1012 (2013.01); B60K 2350/1028 (2013.01); G06F 2203/04101 (2013.01); G06F 2203/04108 (2013.01); G09G 5/363 (2013.01); G09G 2330/022 (2013.01); Y02B 60/1242 (2013.01); Y02B 60/1289 (2013.01)

(58) Field of Classification Search
CPC ........ G06F 3/041; G06F 3/044; G06F 3/0416; G06F 1/324; A61B 5/02416; A61B 5/1123; A61B 5/681; H04W 4/008

USPC .. 345/170–175; 200/600; 342/451; 359/296; 705/26.1

See application file for complete search history.

(56) References Cited

U.S. PATENT DOCUMENTS

| | | | |
|---|---|---|---|
| 8,020,025 B2 | 9/2011 | Hyatt | |
| 8,228,234 B2 * | 7/2012 | Paulson et al. | 342/451 |
| 2003/0067451 A1 * | 4/2003 | Tagg et al. | 345/174 |
| 2005/0094036 A1 * | 5/2005 | Tichelaar | 348/730 |
| 2006/0284857 A1 | 12/2006 | Oh | |

(Continued)

FOREIGN PATENT DOCUMENTS

WO 2011036492 A2 3/2011

OTHER PUBLICATIONS

Messina, John; Mitsubishi 3D Touch Panel Demonstrated, http//www.physorg.com/news156159930.html; Mar. 3, 2009, pp. 1-9.

(Continued)

Primary Examiner — Kent Chang
Assistant Examiner — Sujit Shah
(74) Attorney, Agent, or Firm — The Danamraj Law Group, P.C.; Thomas L. Crisman; Kenneth A. McClure (57) ABSTRACT

An electronic device with a touch screen display that includes capacitive sensing to determine the point of contact between the display and an input device. The device also includes a graphics circuit for rendering images on the touch screen display. The graphics circuit may be inactivated when not in use. The inactive mode provides a variety of advantages, such as a lower power drain on the power source. The device is further configured to sense the approach of an input device in proximity to the display. The device is configured to start activating the graphics circuit upon sensing the approach of the input device prior to contact with the display. The timing of the activation improves responsiveness of the electronic device.

10 Claims, 7 Drawing Sheets

(56) References Cited

U.S. PATENT DOCUMENTS

| | | | |
|---|---|---|---|
| 2007/0115290 A1* | 5/2007 | Polzin et al. | 345/501 |
| 2007/0150842 A1* | 6/2007 | Chaudhri | G06F 3/04883 715/863 |
| 2009/0008234 A1 | 1/2009 | Tolbert et al. | |
| 2009/0189875 A1 | 7/2009 | Ma | |
| 2010/0058056 A1* | 3/2010 | Wang | 713/168 |
| 2010/0099394 A1 | 4/2010 | Hainzl | |
| 2010/0265209 A1 | 10/2010 | Nurmi et al. | |
| 2010/0277505 A1* | 11/2010 | Ludden et al. | 345/634 |
| 2010/0321321 A1 | 12/2010 | Shenfield et al. | |
| 2011/0012869 A1 | 1/2011 | Klinghult | |
| 2011/0080367 A1* | 4/2011 | Marchand et al. | 345/174 |
| 2011/0090161 A1 | 4/2011 | Tsuzaki et al. | |
| 2011/0109624 A1* | 5/2011 | Greenberg | G06F 1/3203 345/419 |
| 2011/0191615 A1* | 8/2011 | Alben | H03L 7/06 713/322 |
| 2011/0193809 A1* | 8/2011 | Walley et al. | 345/173 |
| 2011/0267296 A1* | 11/2011 | Noguchi et al. | 345/173 |
| 2011/0268425 A1* | 11/2011 | Glen | H04N 5/63 386/272 |
| 2011/0304648 A1 | 12/2011 | Kim et al. | |
| 2012/0005509 A1* | 1/2012 | Araki et al. | 713/323 |
| 2012/0062470 A1* | 3/2012 | Chang | 345/173 |
| 2012/0062479 A1* | 3/2012 | Feldstein et al. | 345/173 |
| 2012/0223890 A1* | 9/2012 | Borovsky et al. | 345/173 |
| 2012/0264398 A1* | 10/2012 | Liu et al. | 455/410 |
| 2012/0310760 A1* | 12/2012 | Phillips et al. | 705/26.1 |
| 2013/0027386 A1* | 1/2013 | Small | 345/419 |
| 2013/0054998 A1* | 2/2013 | Wyatt et al. | 713/323 |

OTHER PUBLICATIONS

Altera; "Developing Multipoint Touch Screens and Panels With CPLDS", White Paper; WP-0186-1.0 Feb. 2009, ver. 1.1; pp. 1-5; San Jose, CA.

Kolokowsky, Steve and Davis, Trevor; Touchscreens 101: Understanding Tourhscreen Technology and Design; Cypress Semiconductor Corp., Jun. 29, 2009; http://www.eetimes.com/design/analog-design/4010387/touchscreens-101-Understanding. pp. 1-8.

Lee, Mark. "Mobile Handset Touches on Capacitive Sensing." 5 pages. Published in EETimes. Jun. 2007. http://www.eetimes.com.

* cited by examiner

USER INTERFACE RESPONSIVENESS IN AN ELECTRONIC DEVICE HAVING A TOUCH SCREEN DISPLAY

TECHNICAL FIELD

The present application relates generally to an electronic device with a touch screen display, and in particular to an electronic device configured to activate a graphics circuit that renders images to the touch screen based on the physical approach of an input device.

BACKGROUND

Electronic devices may include a touch screen display for displaying images and receiving user input. The user can contact specific locations on the touch screen display with an input device to enter a command for the electronic device to perform a specific function. Touch screen displays are common for a variety of different electronic devices. Many electronic devices include components that enter an inactive mode when not in use. The inactive mode may use less power and therefore extend the battery life.

A drawback of placing components in the inactive mode is the potential for an increased response time of the device after the occurrence of an activation event. For example, the response time may be necessary to activate component hardware, for running an initiation sequence for ASIC blocks, and to download firmware. This delay may be seen by the user as the device being non-responsive (i.e., slow). This may be frustrating to the user who desires to have immediate functionality.

There is a need for an electronic device that accommodates both a responsive touch screen display and the extended battery life resulting from the inactive mode.

SUMMARY

According to one or more embodiments, the present application is directed to an electronic device that includes a capacitive touch screen. The electronic device is configured to be responsive to user input through the touch screen display and also provide for an inactive mode for extended battery life.

One embodiment includes a method of operating the electronic device that includes a capacitive touch screen display. The method includes placing a graphics circuit that renders images to the touch screen display in an inactive mode. While in the inactive mode, the device senses a user input device in a capacitive field of the touch screen prior to the input device contacting the touch screen. In response to sensing the user input device within the capacitive field, the device activates the graphics circuit and renders an image on the touch screen.

Rendering the image on the touch screen display may include rendering the image on the touch screen display prior to sensing that the user input device has contacted the touch screen. The method may include sensing the user input device contacting the touch screen and in response rendering a second image on the touch screen display. The touch screen display may be blank in the inactive mode. Sensing that the user input device is within the capacitive field of the touch screen display may occur when the user input device is within 0.02 meters of the touch screen display. The method may also include estimating a position that the user input device will contact the touch screen prior to the user input device contacting the touch screen and rendering an image on the touch screen display responsive to the estimated position. The method may include placing the graphics circuit in the inactive mode immediately after rendering the image on the touch screen display. The method may include after rendering the image on the touch screen, placing the graphics circuit in the inactive mode a predetermined period of time after a user event.

Another method of operating an electronic device with a capacitive touch screen includes placing a graphics circuit in an inactive mode. While in the inactive mode, sensing a disturbance in a capacitive field of the touch screen display prior to sensing a contact with the touch screen display. In response to sensing the disturbance, activating the graphics circuit, and rendering an image on the touch screen display.

Sensing the disturbance within the capacitive field may include sensing an approaching user input device that is spaced away from the touch screen display. The method may also include performing at least one initiation sequence in response to sensing the disturbance within the capacitive field. The method may include sensing contact with the touch screen display and, in response, rendering a second image on the touch screen display. Another step may include displaying a blank screen on the touch screen display while the graphics circuit is in the inactive mode. The method may include determining an expected point of contact with the touch screen display prior to sensing contact with the touch screen display and rendering a different image on the touch screen display. The different image may be rendered on the touch screen display prior to sensing the contact with the touch screen display.

Another embodiment is directed to an electronic device. The device includes a touch screen display having an outwardly-extending capacitive field. A sensor detects a disturbance in the capacitive field caused by a user input device that is distanced away from the touch screen display. A graphics circuit is configured to render images on the touch screen display. A battery powers at least the graphics circuit. The device also includes a control circuit that maintains the graphics circuit in an inactive mode prior to the sensor detecting the disturbance in the capacitive field. The control circuit is configured to activate the graphics circuit to render an image on the touch screen display in response to the sensor detecting the disturbance in the capacitive field and prior to detecting contact with the touch screen.

The device may also include that the control circuit may maintain the touch screen display blank when the graphics circuit is in the inactive mode. The electronic device may be a mobile terminal. The device may also include at least one component controlled by the control circuit, and that is configured to send signals to the control circuit that are rendered by the graphics circuit and imaged on the touch screen display. The control circuit may inactivate the graphics circuit immediately after the images are rendered on the touch screen display.

DETAILED DESCRIPTION

The present application is directed to an electronic device with a touch screen display. The touch screen includes capacitive sensing to determine the point of contact between the display and an input device. The device also includes a graphics circuit for rendering images on the touch screen display. The graphics circuit may be inactivated when not in use. The inactive mode may provide a variety of advantages, such as a lower power drain on the power source. The device is further configured to sense the approach of an input device in proximity to the display. The device may activate the graphics circuit upon sensing the approach of the input device prior to contact with the display. The timing of the activation improves responsiveness of the electronic device.

Figure 1:
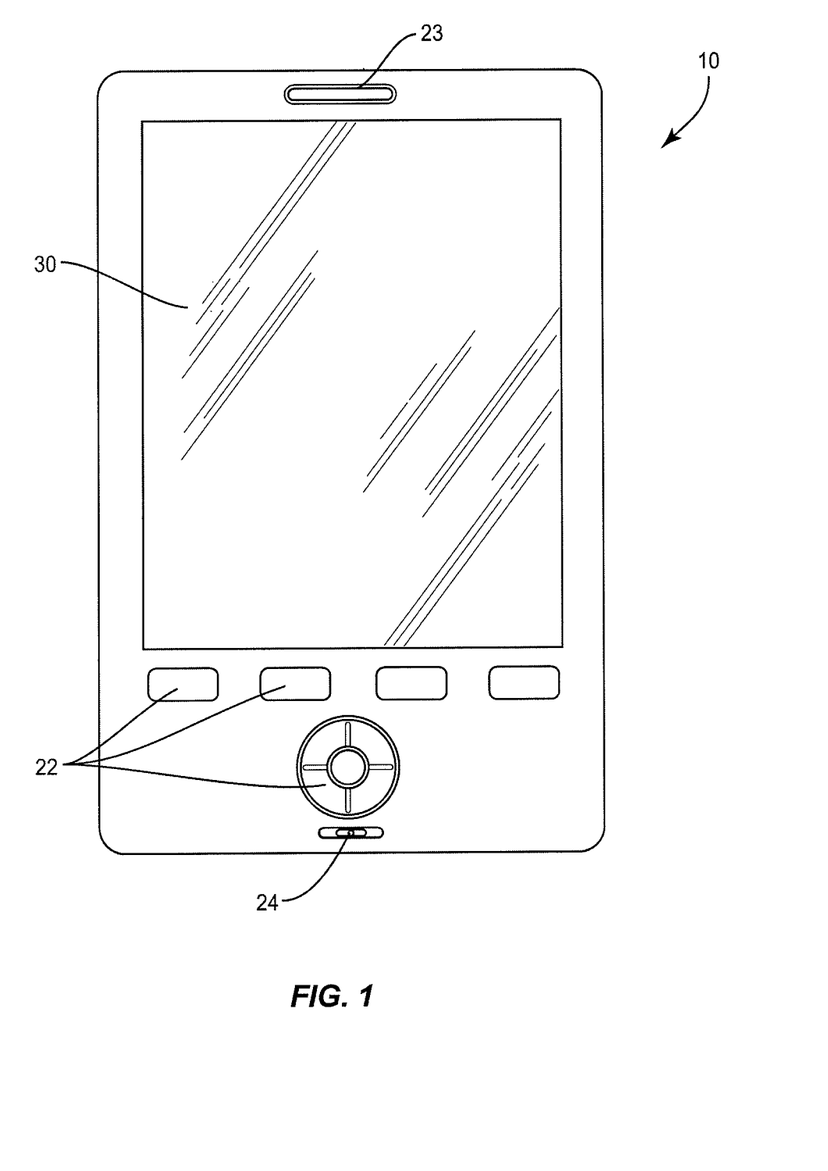
FIG. 1 is a front view of an electronic device with a touch screen display.

The present invention may be used in a variety of different electronic devices 10. One type of device 10 is a mobile terminal sized to be carried by the user and include embodiments such as mobile cellular telephones as illustrated in FIG. 1, music players, digital cameras, smart phones, lap top computers, and personal digital assistants (PDA). Other devices 10 are configured to be mounted in a fixed position (i.e., cannot be carried by the user). Examples may include in-dash navigation systems as illustrated in FIG. 2, automated teller machines (ATM) for financial transactions, machine controls, and kiosks for displaying information.

Figure 2:
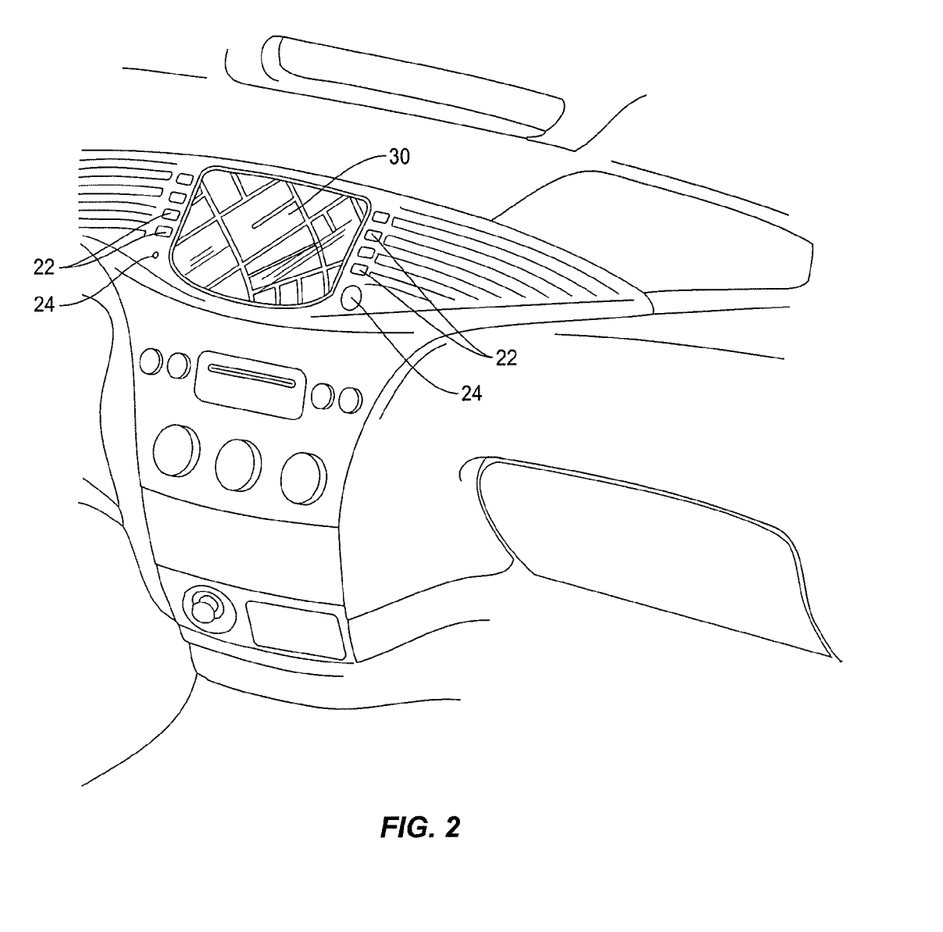
FIG. 2 is a front view of an electronic device with a touch screen display.

As illustrated in FIGS. 1 and 2, the devices 10 include a touch screen display 30 for displaying information and receiving user input. Additional keys 22 may be positioned in proximity to the touch screen 30 for additional user input. The keys 22 may include alphanumeric keys for allowing entry of alphanumeric information such as telephone numbers, contact information, messages, etc. Keys 22 may also include functional keys for performing specific functions available with the device 10 (e.g., answer a call, send data). The devices 10 may further include a speaker 23 and microphone 24 for audio communication.

FIG. 1 includes the device 10 with a basic block configuration. The device 10 may have other configurations, including a clamshell, pivot, swivel, and/or sliding cover configuration.

Figure 3:
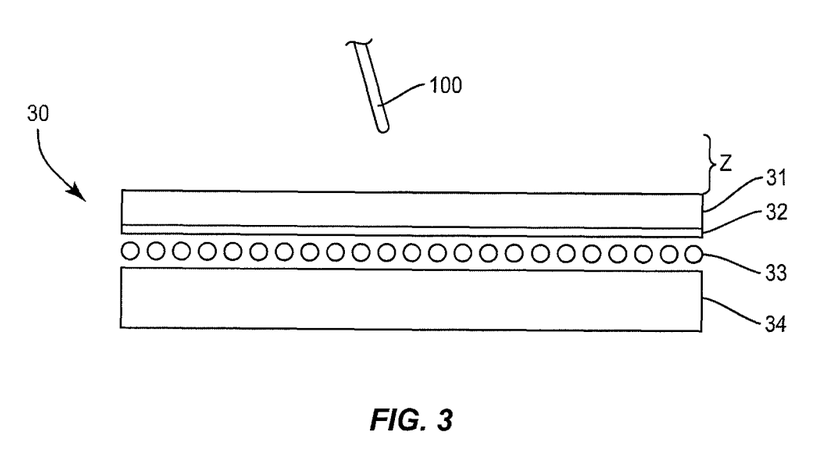
FIG. 3 is a side schematic view of a display and an outwardly-extending field that extends beyond the touch screen display.

The touch screen 30 displays information relevant to the user. Inputs can be entered directly by the user by contacting the display with an input device 100, such as a finger, hand, conductive glove, and stylus. In one embodiment, the touch screen 30 includes projective capacitive touch technology to sense the input device 100 prior to actual contact with the touch screen 30. FIG. 3 illustrates a schematic sectional view of one embodiment of a touch screen display 30 that forms a projected field Z. The touch screen display 30 includes a first layer 31 and a conductive layer 32. The layers 31, 32 may be constructed from various materials, such as glass or plastic for the first layer 31 and Indium-Tin-Oxide (ITO) for the conductive layer 32. The conductive layer 32 may be deposited onto the underside of the first layer 31. In one embodiment, the conductive layer 32 is deposited by sputtering.

The touch screen 30 further includes an array 33 of X sensors and Y sensors. The array 33 may include a wire for each of the X and Y sensors (e.g., a 6×8 panel includes a total of 14 connections). In one embodiment, the display 30 includes a grid pattern that forms electrodes etched on the conductive layer 32. The arrays 33 may also be aligned in different layers with an intermediate separating layer. In one embodiment, a pair of etched layers each with a series of parallel lines is placed perpendicular to one another to form the X-Y array 33.

A liquid crystal display (LCD) 34 is positioned below the array 33 for displaying the rendered graphics. In one embodiment, an air gap is formed between the array 33 and the LCD 34. The air gap may be formed by a gasket that is positioned between and extends around the periphery of the array 33 and/or LCD 34

The touch screen 30 provides for determining a point of contact with the input device 100 in the X-Y coordinate configuration. In addition, the touch screen 30 is further able to detect the approach of the input device 100 prior to actual contact with the display 30 (i.e., prior to the input device 100 contacting the first layer 31). The approach of the input device 100 is determined by intrusion in the projected field Z.

As illustrated in FIG. 3, the projected field Z extends outward from the display 30. As the input device 100 approaches the display 30, a capacitor is formed between the input device 100 and the display 100. The capacitor is within a range to be readily measured. In one embodiment, the field Z projects outward from the first layer 31 about 0.02 m. The touch screen 30 is therefore configured to operate in two separate modes: a first proximity state senses the approach of the input device 100 (i.e, the input device 100 in the field Z prior to actual contact with the display 30); and a second contact state that senses the point of contact of the input device 100 with the touch screen 30 (i.e., the contact point between the input device 100 and the first layer 31).

Figure 4:
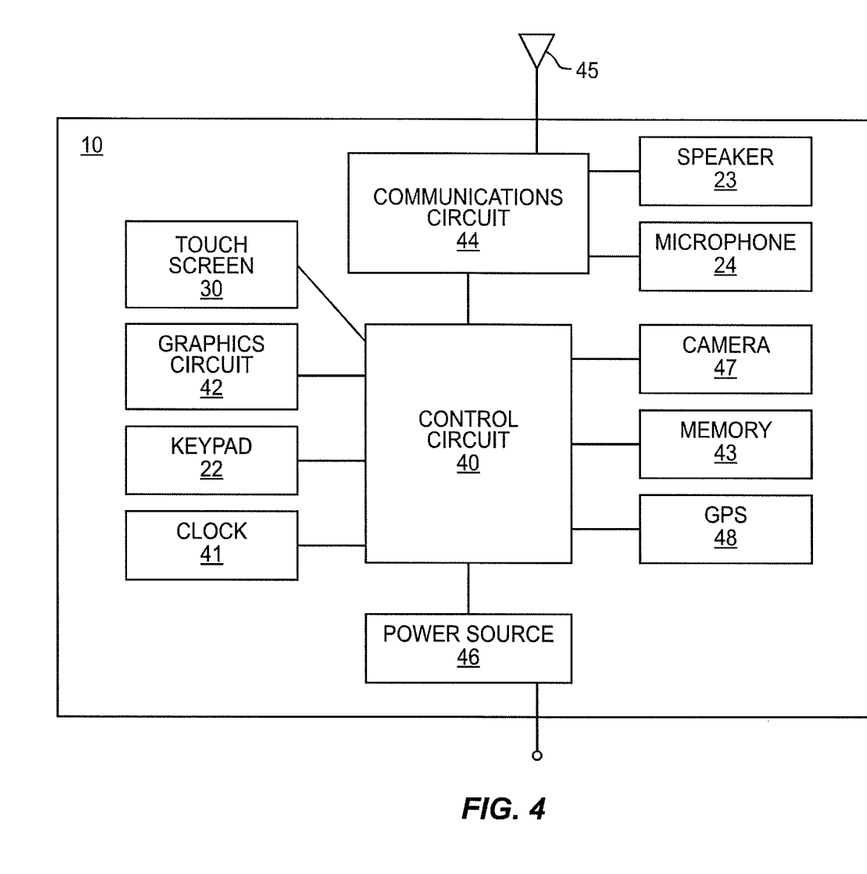
FIG. 4 is a block diagram of functional elements of an electronic device.

A block diagram illustrating the functional elements of the electronic device 10 is illustrated in FIG. 4. A control circuit 40 controls the overall functioning of the device 10 and may include a processor or a microcontroller. The control circuit 40 may be configured to execute program code embodied within the device 10 to control the various components and their functions.

A clock 41 is associated with the control circuit 40 that measures the various timing requirements for specific events. The clock 41 may be independent from the control circuit 40 as illustrated in FIG. 4. In another embodiment, the clock 41 is incorporated within the control circuit 40.

The touch screen display 30 is configured to display information and receive input from the user as explained above. A graphics circuit 42 provides for graphics rendering with the touch screen 30. The graphics circuit 42 may function through the control circuit 40 and may not be directly associated with the touch screen 30. The graphics circuit 42 may include one or more processors, decoders, buffers, and program codes configured to receive image signals and render an image on the display 30. In one embodiment, the graphics circuit 42 includes a decoder that receives signals from the control circuit 40. The signals may originate at the control circuit 40, memory 43, communications circuit 44, or other device component such as the camera 47 and GPS 48. The graphics circuit 42 processes the signals to produce bits of a rendered image that are displayed at the display 30. In one embodiment, the graphics circuit 42 performs computations limited to graphics rendering. Other embodiments may include the graphics circuit 42 having additional computations for other applications.

The communications circuit 44 provides for communications with other devices. The circuit 44 may include an antenna 45 to facilitate the communications. The circuit 44 may include a radio frequency transmitter and receiver for transmitting and receiving signals through the antenna 45.

The communications circuit 44 may also include audio processing functionality to process voice data for communications through the speaker 23 and microphone 24. The communications circuit 44 may further be configured to send and receive and process data such as electronic mail, text messages, files, and streaming audio and video.

The device 10 may further include a variety of other components that perform various functions. Examples of these illustrated in FIG. 4 include a camera 47 and a GPS/mapping component 48.

Memory 43 may include one or several types of memory, including read-only memory, random-access memory, flash memory, magnetic or optical storage devices, or the like. In some embodiments, one or more physical memory units may be shared by the various components, such as the graphics and communications circuits 42, 44. Other embodiments may have physically separate memories for one or more of the different components.

A power source 46 is configured to power the device 10. In one embodiment, the power source 46 includes a battery that may be recharged through an attachable power charger. In some embodiments such as fixed devices 10 (e.g., FIG. 2), the power source 46 is external to and operatively connected to power the device 10.

The control circuit 40 is configured to place the graphics circuit 42 in an inactive mode when not in use. The inactive mode may occur because there have been no activation events within a predetermined period of time. Activation events include an event that causes an image to be rendered by the graphics circuit 42. There may be a variety of activation events, including receipt of an incoming message (SMS or electronic mail), an incoming call, and user contact with the display. The image to be rendered may be stored in memory 43, received through the communications circuit 44, processed by the camera 47, and various others.

The graphics circuit 42 may be placed in the inactive mode a predetermined period of time after the last activation event. In one embodiment, 30 seconds after the last image is rendered to the touch screen 30. This may also occur immediately after the graphics circuit 42 has rendered an image.

The inactive mode uses a lower amount of power than when the graphics circuit 42 is functioning in an active mode. In one embodiment, the graphics circuit 40 in the inactive mode draws no power from the power source 46.

The graphics circuit 42 may be completely inactivated with all functionality off when in the inactive mode. Another embodiment provides for a minimal amount of the rendering ability. In another embodiment, the inactive mode includes the rendering aspects of the graphics circuit 42 being off, with other functionality remaining active to perform various other functions in the device 10.

In one embodiment, the display 30 includes a blank screen in the inactive mode. In another embodiment, the display 30 may include a single, non-changing image.

Placing the graphics circuit 42 in the inactive mode provides a number of advantages. One main advantage is the inactive mode draws less power from the power source 46 thus prolonging the use between recharging. A disadvantage is the time necessary to activate the graphics circuit 42 to be responsive to the needs of the user. The electronic device 10 is therefore configured to sense the input device 100 within the capacitive field Z and begin activating the graphics circuit 42. This increases the responsiveness of the device 10 and still provides for utilization of the inactive mode.

The approach of the input device 100 is sensed by the capacitive display 30 as an indication that an input from the user is imminent. The approach is sensed by the display 30 which then signals the control circuit 40. The control circuit 40 then activates the graphics circuit 42. In one embodiment, the field Z extends about 0.02 m from the display 30, and the input device 100 moves at about 0.2 m/s. Therefore, the device 100 begins to react about 1 ms sooner than if it were to wait until sensing actual contact between the input device 100 and the display 30. The device 10 may be responsive for the graphics circuit 42 to be activated and completely functioning by the time the actual contact is sensed. Other embodiments may include the graphics circuit 42 not fully activated and functional at the time of actual contact. In either instance, the extra time to activate the graphics circuit 42 improves the responsiveness of the device 10.

Figure 5:
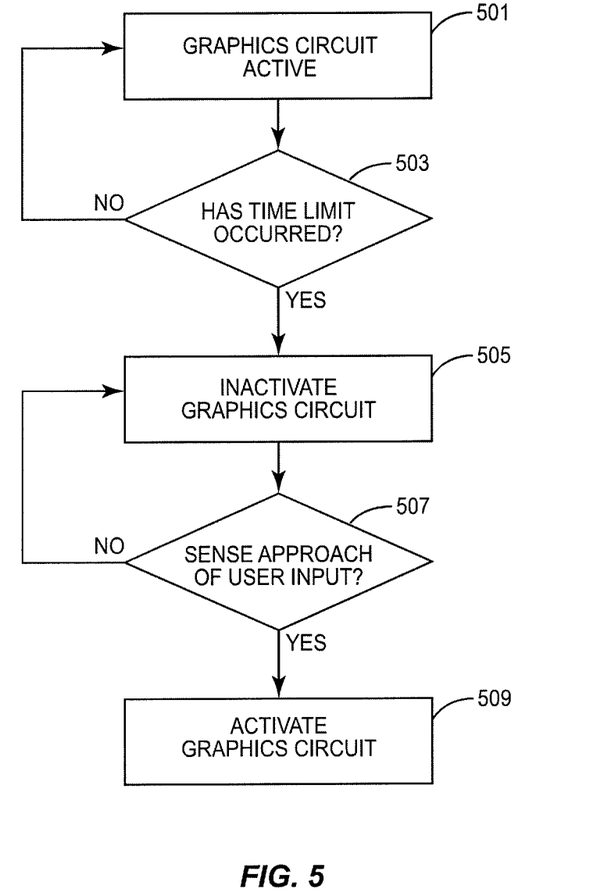
FIGS. 5-7 are flow diagrams of method of operating an electronic device with a touch screen display and a graphics circuit.

FIG. 5 illustrates one method of controlling the operation of the graphics circuit 42. The method starts with the graphics circuit 42 being in an active mode (step 501). The control circuit 40 then determines whether the time limit since the last activation event has occurred (step 503). If the time limit has not passed, the graphics circuit 42 remains active. If the time period has passed, the graphics circuit 42 is placed in the inactive mode (step 505). The graphics circuit 42 remains in the inactive mode until sensing the approach of a user input at the display 30 (step 507). Once this occurs, the control circuit 40 re-activates the graphics circuit 42 in preparation for the user input caused by contact of the user device 100 with the display 30 (step 509).

Figure 6:
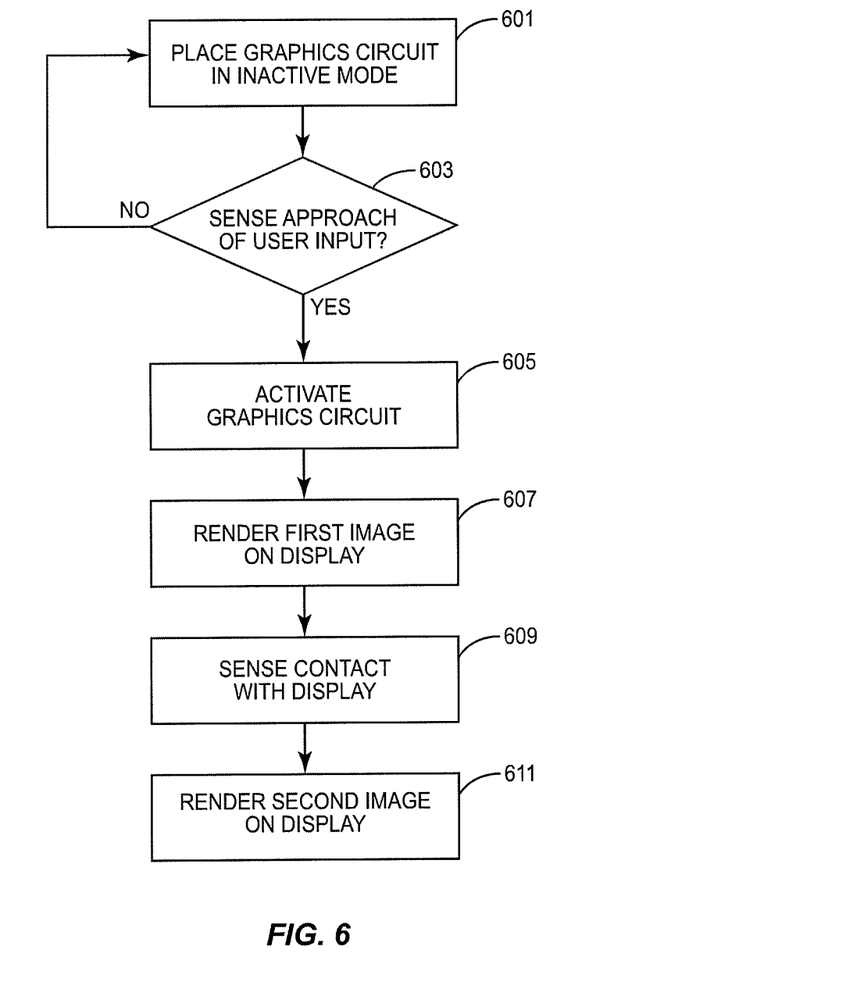

FIG. 6 illustrates another method of changing the mode of the graphics circuit 42. The graphics circuit 42 is placed in an inactive mode by the control circuit 40 (step 601). This may be caused by a period of inactivity, or some other event as explained above. In one embodiment, the user is able to place the graphics circuit 42 in the inactive mode. While in the inactive mode, the device 10 senses the approach of the input device 100 towards the display 30 (step 603). When the input device 100 is sensed, the graphics circuit 42 is activated (step 605). Further, a first image is rendered on the display 30 (step 607). This first image may be the last image that was rendered prior to the graphics circuit 42 being placed in the inactive mode. The first image may also be a default image (e.g., a home page or personalized image).

After the first image is rendered on the display 30, the point of contact with the display 30 is sensed (step 609). The point of contact is determined in the X-Y coordinates through the array 33 in the touch screen display 30 as explained above. A second image is then rendered on the display 30 based on the specific contact point (step 611). The second image corresponds to the actual point of contact.

Figure 7:
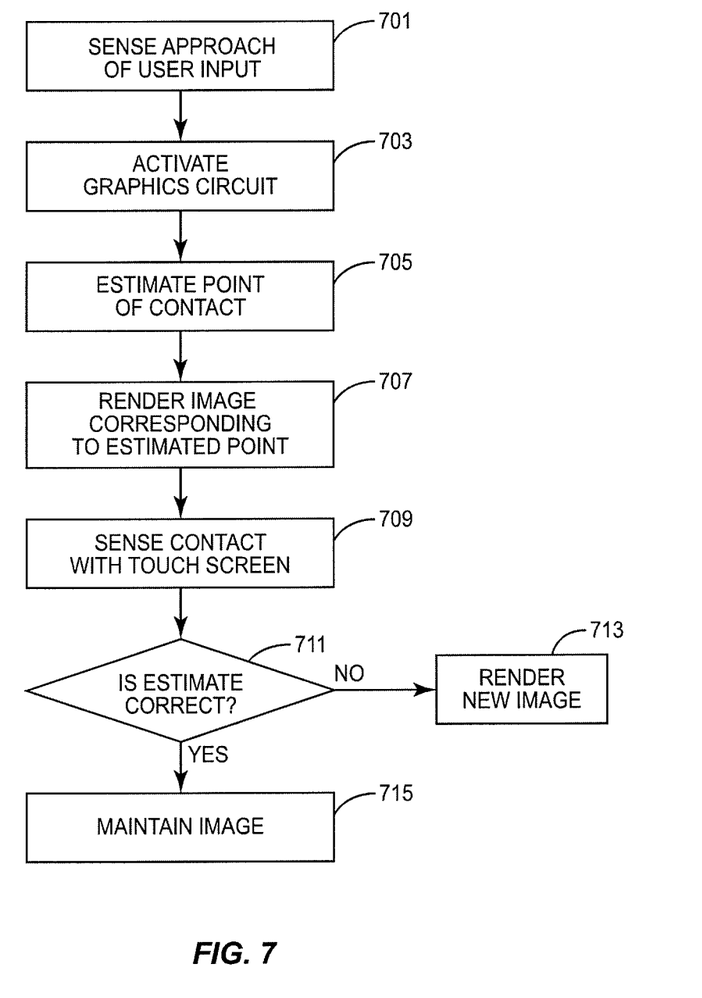

FIG. 7 illustrates another process of displaying information and controlling the graphics circuit 42. The graphics circuit 42 is in the inactive mode when the approach of the user device 100 is sensed in the projected field Z (step 701). Upon receiving a signal from the display 30, the control circuit 40 activates the graphic circuit (step 703).

Next, the estimated point of contact between the input device 100 and the display 30 is determined (step 705). In one embodiment, the estimated contact point is the location on the display 30 directly adjacent to the point of distortion caused by the introduction of the input device 100 into the field Z. The graphics circuit 42 then renders an image corresponding to the estimated point of contact (step 707). The point of actual contact with the touch screen 30 is then also determined (step 709). It is then determined whether the estimated point of contact is the same as the actual point of contact (step 711). If the two are the same, the image is maintained on the display 30 (step 715). If the two are different, the graphics circuit 42 renders a new image corresponding to the actual point of contact (step 713).

The timing for activating and deactivating the graphic circuit 42 may vary depending upon the various configurations. In one embodiment, the graphics circuit 42 is deactivated immediately after image rendering is completed. The device 10 does not wait any time period.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating an electronic device that includes a capacitive touch screen display, comprising:
   sending image signals from a control circuit to a graphics circuit and rendering images on a touch screen display;
   placing the graphics circuit that renders the images to the touch screen display in an inactive mode while the control circuit that inactivated and that controls the graphics circuit and the touch screen display remains in an active mode, the graphics circuit configured to render an image in the inactive mode with a reduced rendering ability;
   while the graphics circuit is in the inactive mode, sensing a user input device in a capacitive field of the touch screen prior to the input device contacting the touch screen while the control circuit remains in the active mode; and
   in response to sensing the user input device within the capacitive field, activating the graphics circuit;
   while the graphics circuit is active, estimating a point of contact on the touch screen display;
   rendering a first image on the touch screen display corresponding to the estimated point of contact;
   determining an actual initial point of contact on the touch screen display, the actual initial point of contact being the point where the touch screen display is initially contacted by the user; and
   maintaining the first image on the touch screen display when the actual initial point of contact is the same as the estimated point of contact, otherwise when the actual initial point of contact is different than the estimated point of contact rendering a second image on the touch screen display corresponding to the actual initial point of contact, the second image being a new image corresponding the actual initial point of contact.

2. The method of claim 1, wherein rendering the image on the touch screen display comprises rendering the first image on the touch screen display prior to sensing that the user input device has contacted the touch screen.

3. The method of claim 1, wherein the touch screen display is blank in the inactive mode.

4. The method of claim 1, wherein sensing the user input device is within the capacitive field of the touch screen display occurs when the user input device is within 0.02 meters of the touch screen display.

5. The method of claim 1, further comprising placing the graphics circuit in the inactive mode immediately after rendering the second image on the touch screen display.

6. The method of claim 1, further comprising after rendering the second image on the touch screen, placing the graphics circuit in the inactive mode a predetermined period of time after a user event.

7. A method of operating an electronic device with a capacitive touch screen, comprising:
   sending image signals from a control circuit to a graphics circuit and rendering images on a touch screen display;
   placing the graphics circuit in an inactive mode while the control circuit that placed the graphics circuit in the inactive mode and that controls the graphics circuit is in an active mode, the graphics circuit configured to render an image in the inactive mode;
   while the control circuit is in the active mode and the graphics circuit is in the inactive mode, sensing a disturbance in a capacitive field of the touch screen display prior to sensing a contact with the touch screen display;
   in response to sensing the disturbance, the control circuit activating the graphics circuit;
   while the graphics circuit is active, estimating a point of contact on the touch screen display;
   rendering a first image on the touch screen display corresponding to the estimated point of contact;
   determining an actual initial point of contact on the touch screen display; and
   maintaining the first image on the touch screen display when the actual initial point of contact is the same as the estimated point of contact, otherwise when the actual initial point of contact is different than the estimated point of contact rendering a second image on the touch screen display corresponding to the actual initial point of contact, the second image being a new image corresponding to the actual point of contact.

8. The method of claim 7, wherein sensing the disturbance within the capacitive field includes sensing an approaching user input device that is spaced away from the touch screen display.

9. The method of claim 7, further comprising performing at least one initiation sequence in response to sensing the disturbance within the capacitive field.

10. The method of claim 7, further comprising displaying a blank screen on the touch screen display while the graphics circuit is in the inactive mode.

* * * * *

UNITED STATES PATENT AND TRADEMARK OFFICE
CERTIFICATE OF CORRECTION

PATENT NO. : 9,552,094 B2
APPLICATION NO. : 13/334595
DATED : January 24, 2017
INVENTOR(S) : Lars Persson It is certified that error appears in the above-identified patent and that said Letters Patent is hereby corrected as shown below:

On the Title Page

In Item (75), under "Inventor", in Column 1, Line 1, delete "Sodra Sandby" and insert -- Södra Sandby --, therefor.

On Page 2, in Item (56), under "OTHER PUBLICATIONS", in Column 2, Line 5, delete "Tourhscreen" and insert -- Touchscreen --, therefor.

In the Specification

In Column 4, Line 10, delete "LCD 34" and insert -- LCD 34. --, therefor.

In Column 5, Line 44, delete "graphics circuit 40" and insert -- graphics circuit 42 --, therefor.

In the Claims

In Column 7, Line 50, in Claim 1, delete "corresponding the" and insert -- corresponding to the --, therefor.

Signed and Sealed this
Eighteenth Day of October, 2022

*Katherine Kelly Vidal*
Katherine Kelly Vidal
*Director of the United States Patent and Trademark Office*